Figure 1:
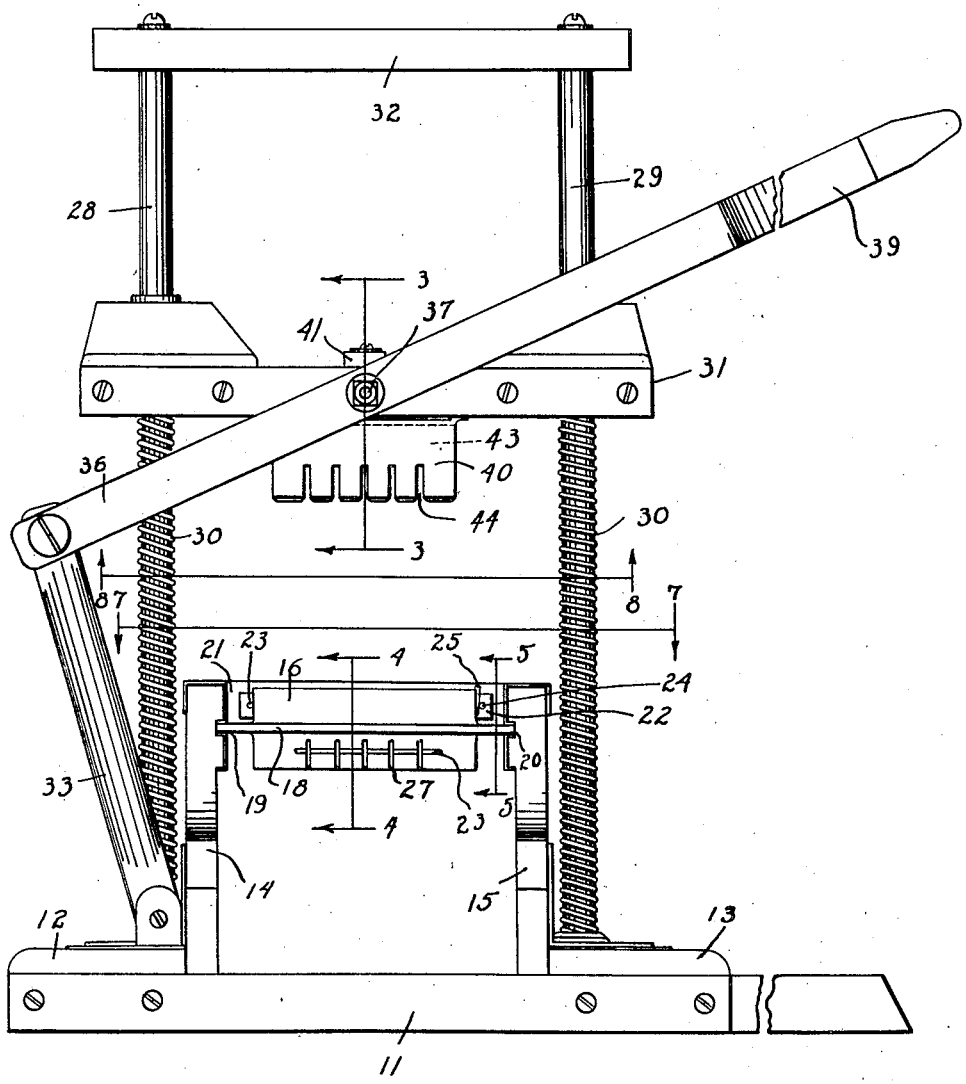

April 11, 1944. G. W. WATTS 2,346,282
VEGETABLE STRIP CUTTER
Filed March 6, 1942 3 Sheets-Sheet 1

INVENTOR,
GEORGE W. WATTS,
BY
ATTORNEYS.

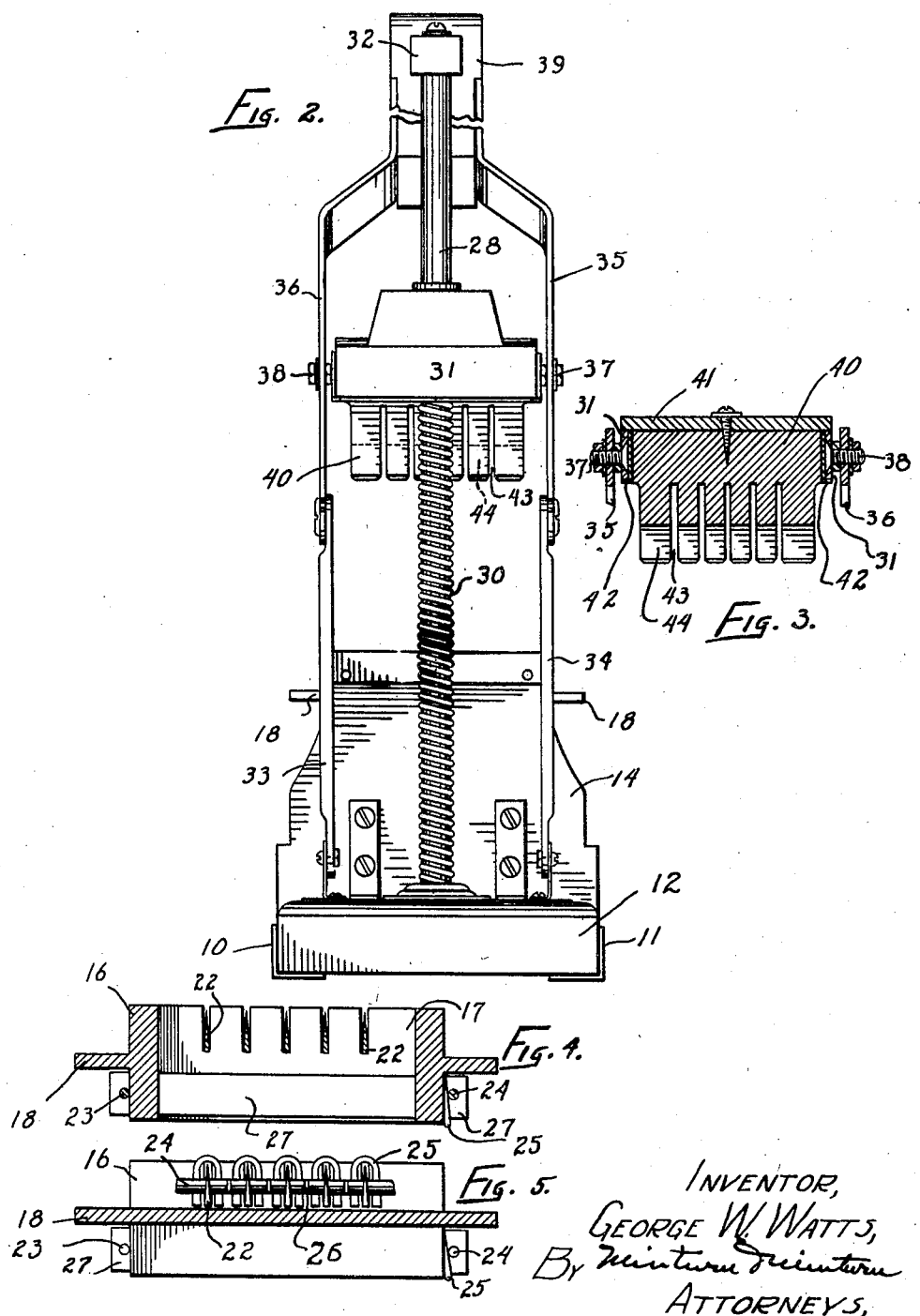

April 11, 1944.  G. W. WATTS  2,346,282
VEGETABLE STRIP CUTTER
Filed March 6, 1942   3 Sheets-Sheet 3
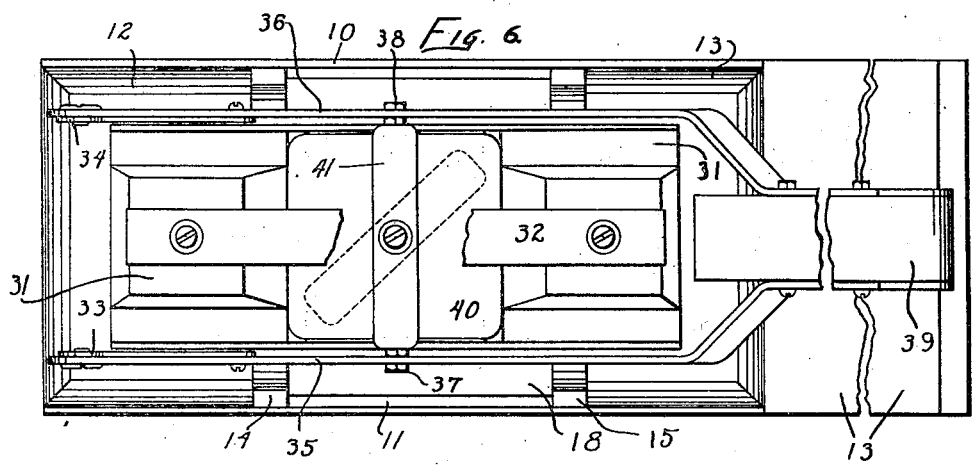
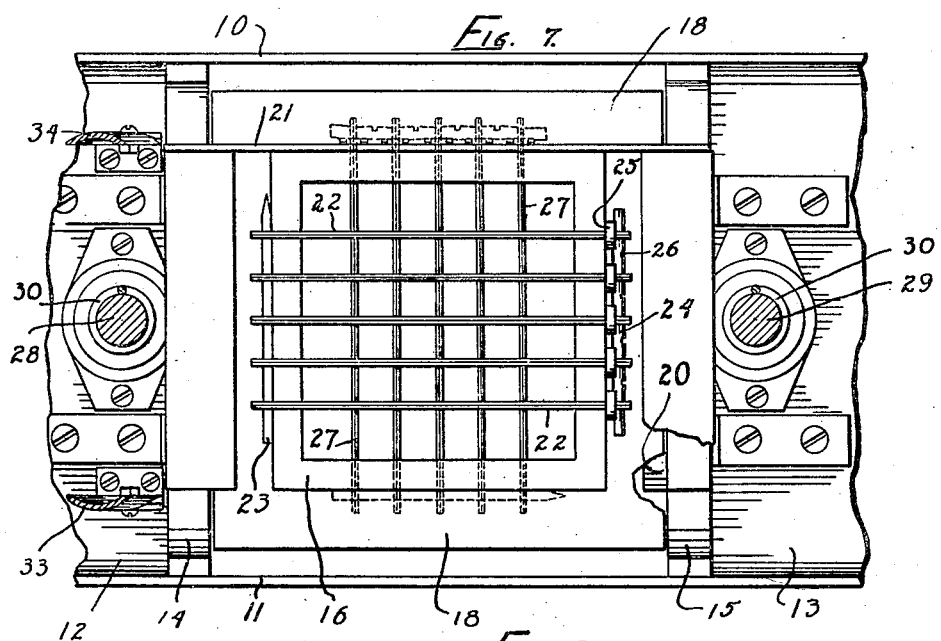
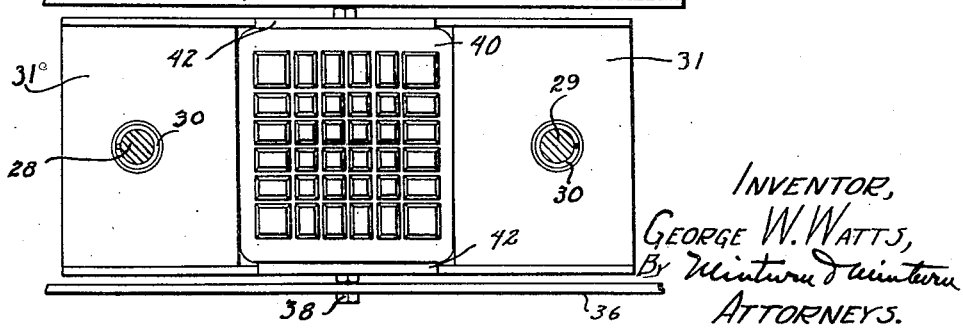
INVENTOR,
GEORGE W. WATTS,
By Minturn & Minturn
ATTORNEYS.

Patented Apr. 11, 1944

2,346,282

UNITED STATES PATENT OFFICE 2,346,282

VEGETABLE STRIP CUTTER

George W. Watts, Indianapolis, Ind.

Application March 6, 1942, Serial No. 433,591

2 Claims. (Cl. 146—78)

This invention relates to means for cutting vegetables, such as potatoes, into sections. While the device may be employed for sectioning turnips, carrots, and in fact any like vegetable of firm nature, the invention will be described in reference to the cutting of potatoes particularly for use in french frying and the like. In any event the invention is adapted for use in forcing such vegetables across knives to produce regular sections of those vegetables in accordance with the spacing apart and arrangement of the knives.

While I am aware of the fact that devices have been developed and employed for the cutting of potatoes into elongated sections, difficulty has been encountered with such devices that have come to my attention in that an unwarranted amount of power has been required to force the potato across and between the knives; too much complication existed; knives could not be readily removed for sharpening or replacement; the structure could not be kept in a clean condition; and such structures did not lend themselves to both small and quantity production in the same structure.

By means of my invention, the cutting knives are so arranged and supported one in reference to the other that the knives may yield in relation to each other to permit easy passage of the potato sections therebetween to the end that a minimum amount of pressure is required to be applied to the potato to force it across the cutting knives. Moreover another particularly important advantage of the invention resides in the knife mounting means whereby the knives may be removed as a unit from the supporting structure for cleaning purposes and, importantly, to permit knife positioning, adjusting, and tensioning of those knives.

These and other objects and advantages of the invention arising from the particular combinations set forth in the appended claims, including those advantages of a more facile, economic and efficient operation in comparison to the heretofore known structures, will become apparent to those versed in the art in the following description of one particular form of the invention as illustrated in the accompanying drawings, in which Fig. 1 is a view in side elevation of a structure embodying the invention;

Fig. 2, a view in end elevation;

Fig. 3, a view in vertical transverse section on the line 3—3 in Fig. 1;

Fig. 4, a view in vertical section on the line 4—4 in Fig. 1;

Fig. 5, a view in vertical section on the line 5—5 in Fig. 1;

Fig. 6, a view in top plan elevation of the structure;

Fig. 7, a view on an enlarged scale in horizontal transverse section on the line 7—7 in Fig. 1; and Fig. 8, a view in horizontal transverse section on the line 8—8 in Fig. 1.

Like characters of reference indicate like parts throughout the several views in the drawings.

Upon any suitable frame or base, herein shown as a pair of side rails 10 and 11 tied together in spaced apart relation by end plates 12 and 13 spaced one from the other along these rails to leave an opening therebetween, and having upturned pedestals 14 and 15 respectively at their opposing ends, is detachably mounted a knife carrier block 16.

This carrier block 16 is formed preferably out of metal to have an opening 17 therethrough, herein shown as rectangular in shape as defined by opposing vertically disposed walls. Surrounding the block 16 is a laterally extending flange 18, this flange being located substantially centrally of the side walls of the block and extends in a continuous manner from all four walls thereof. This flange 18 is received within opposing horizontally disposed slots 19 and 20 provided in the pedestals 14 and 15 whereby the carrier block 16 may be withdrawn from the pedestals and returned for support thereby by simply sliding the block 16 horizontally within those slots 19 and 20. Interconnecting the back upper ends of the pedestals 14 and 15 is a strap 21 to be in the path of the carrier block 16, preferably in the path of the upper part of the block wall which is above the flange 18. The block 16 may be entered within the slots 19 and 20 by this projecting flange 18 and pushed between the pedestals until the block wall strikes this strap 21.

A plurality of slots are provided across and entering from the top edges of those parts of the end walls of the block 16 which are above the flange 18, five of such slots being shown in each wall, Fig. 7, in the present example of the invention. Knives 22, sharp edge uppermost, are dropped into the respective slots of these opposing walls. Each knife is provided with a hole therethrough in its end portions. A pin 23 is inserted through the holes of the knives on the outside of one of the block walls, the left-hand side as viewed in Fig. 7. A pin 24 is inserted through all of the holes in the other ends of the knives outside of the right-hand wall of the block. The holes in each knife are so located, one in reference to the other, that these pins 23 and 24, when carried through the knife holes, permit slight longitudinal movement of the knives. In order to prevent such movement and apply tension to each individual knife 22, a staple 25 having wedge-shape legs is placed over each knife 22 to straddle it and to extend downwardly along the outer face of the right-hand wall, between that face and the pin 24. Each staple 25 is driven downwardly tending to force that portion of the pin 24 in contact therewith outwardly and thereby tending to cause the particular knife 22 to be streched. The pin 23, of course, resists movement of the knife 22 by forming an abutment against the outer face of the left-hand wall of the block 16. In order that each knife 22 may be individually fixed in position and tensioned as just described, the pin 24 is made to be flexible so that it may bend or yield between the knives 22 to permit the particular knife staple 25 to exert its own individual wedging action without interfering with that action of the next adjacent staple. In the form herein shown, the pin 24 is made out of metal and is provided with a notch 26 between each of the knives 22 so that while the pin consists of one continuous length, it is provided with weakened zones in which the pin may bend under the localized wedging action of an individual staple 25.

In the same manner opposing aligned slots are provided across the front and back walls of the block 16 below the flange 18 and a plurality of knives 27 are positioned and secured across the opening through the block 16 in the same manner exactly as above described in reference to the knives 22. It is to be noted, however, that the knives 27 are turned to have their cutting edges upwardly, Fig. 7, or in other words, these edges are directed towards the closed ends of the slots. The depth of the slots for the two sets of knives 22 and 27 are made to be such that the cutting edges of the lower knives 27 are spaced below the under back edges of the upper knives 22 a distance substantially equal to that of the thickness of the flange 18. In this regard it is to be noted that there is no interconnection or contact between the upper and lower sets of these knives. Furthermore in the particular locations of the upper and lower slots in each of the respective walls of the block 16 the assembled block 16 presents, as viewed from directly above, Fig. 7, rectangular openings between the two sets of knives. The assembling of these knives 22 and 27 is, of course, preferably performed with the block 16 removed from engagement with the pedestals 14 and 15 so that access may readily be had to all sides of the carrier block to permit the fixing in position of the knives thereon.

Extending upwardly from the plates 12 and 13 just outside of the pedestals 14 and 15 are posts 28 and 29 respectively fixed in position and in vertical alignment. Surrounding each of these posts is a coiled spring 30. A crosshead 31 is suitably bored through to receive the respective posts 28 and 29 slidingly therethrough near its end portions. This crosshead 31 normally drops by gravity to rest against the upper ends of the springs 30 surrounding the posts 28 and 29. In order to promote stability, the upper ends of the posts 28 and 29 are herein shown as interconnected by a bar 32.

Rockably fixed to either one of these plates 12 and 13, herein shown as to the plate 12, are a pair of spaced apart links 33 and 34. The upper ends of these links are pivotally connected respectively to the ends of the lever bars 35 and 36 respectively, these bars being rockably engaged by fulcrum bolts 37 and 38 extending from the respective sides of the crosshead 31. From these fulcrum bolts 37 and 38 the lever bars extend beyond the crosshead 31 and are then bent inwardly one toward the other to terminate in an operating handle 39.

The central portion of the crosshead 31 is provided with an opening within which a ram block 40 is detachably received. This block 40 has an upper portion shaped to fit slidingly within the correspondingly shaped opening within the crosshead 31 and is there retained by any suitable means, herein shown as by a latch button 41 which is rotatably attached to the top side of the block 40 to permit end portions of the button to be swung around over the top edges of the parts of the crosshead 31 extending along each side of the block 40. To limit upward travel of the block 40 in reference to the crosshead 31, the block 40 is provided with an outturned foot 42 on each side which comes up into abutment with the under sides of the crosshead 31 appearing on the front and back sides thereof.

The block 40 is provided with a plurality of kerfs in alignment with the knives 22 and 27 when the block 40 is positioned in the crosshead 31 as above described. The kerfs 43 in alignment with the knives 22 are cut sufficiently deep to permit the crossing kerfs 44 to receive the knives 27 therein. These kerfs are so cut that when the handle 39 is pushed downwardly in opposition to the springs 30 against the crosshead 31, the block 40 may be carried on down within the knife carrier block 16 to permit the under face of the block 40 to come at least to the under edges of the knives 27.

To operate the device, a potato (peeled if desired) is placed upon the knives 22 and held between the thumb and fingers of one hand of the operator while the other hand bears down on the handle 39 to have the block 40 engage the potato, whereupon the operator removes his hand holding the potato and pushes on downwardly on the handle 39 to push the potato on down through both sets of knives with the block 40 following through thereafter to cause the potato sections to fall clear and free from the knives. The cut sections obviously will be rectangular in cross-section and may be caught by a vessel placed between the rails 10 and 11, or the device may be placed over a vessel to allow the cut sections to fall between those side rails directly into the vessel. The sections so cut will obviously be rectangular in cross-section. The dimensions of these potato sections may, of course, be varied by positioning the knives in different spaced apart relations in the carrier block 16.

In any event, the handle 39 requires relatively little effort in forcing it downwardly since the knife blades 22 and 27 may yield slightly laterally in each set and therefore the potato sections being cut do not tend to wedge or jam between the knives. The cutting of the potato is, of course, initially started by the upper set of knives 22 which in itself facilitates the operation greatly.

Following the cutting of the required amount of potatoes, the knife carrier block 16 may be pulled laterally outwardly from the device to be cleaned, and also the block 40 if desired may be quickly detached from the supporting head 41 by simply turning the button head to some such position as indicated by the dash line position in Fig. 6. The block 40 may be made out of any desirable material, hard maple being one particular material that is suitable.

It is therefore to be seen that I have provided a very simple device that is operable with a minimum amount of labor and that is so constructed that it may be kept clean with a minimum amount of effort. Moreover the entire device occupies but small space. Therefore, while I have shown and described the invention in the one particular form in more or less minute detail, it is obvious that structural changes may be employed, such as forming the various parts out of pressed steel or the like, carrying the knife carrier directly between the rails 10 and 11 instead of at an elevation thereabove, all without departing from the spirit of the invention to the end that I do not desire to be limited to that precise form beyond the limitations as may be imposed by the following claims.

I claim:

1. Apparatus for cutting vegetables into strips comprising a plurality of spaced apart knives; a second set of spaced apart knives located below and removed from contact with knives of the first set, the knives in one set having their cutting edges directed toward the knives of the other set but in cross relation thereto; knife holding means formed to receive said knives individually; and means for placing the knives under longitudinal tension; said holding means consisting of a box-like member formed by opposing side walls to define an opening therebetween and through the member, said side walls being provided with slots therethrough, through which slots end portions of said knives are passed to have the knives extend across said opening; stop means engaging end portions of said knives outside of said walls; and said tensioning means comprising wedge members entered between said stop means and the outer faces of said walls; said wedge members being staples individually straddling the knives.

2. Apparatus for cutting vegetables into strips comprising a plurality of spaced apart knives; a second set of spaced apart knives located below and removed from contact with knives of the first set, the knives in one set having their cutting edges directed toward the knives of the other set but in crossed relation thereto; knife holding means formed to receive said knives individually; and means for placing each of the knives individually under longitudinal tension; said holding means consisting of a box-like member formed by opposing side walls to define an opening therebetween and through the member, said side walls being provided with slots therethrough, through which slots end portions of said knives are passed to have the knives extend across said opening; stop means engaging end portions of said knives outside of said walls; and said tensioning means comprising a wedge member entered between said stop means at its engagement with each knife and the outer faces of said walls; said stop means consisting of a removable continuous pin member extending through holes in said knife end portions; said pin member engaged by said wedge members being of that nature to permit deformation between knives whereby each knife may be individually tensioned, the wedge engaged pin member having reduced cross-sectional area portions between adjacent knives.

GEORGE W. WATTS.